US012762003B2

(12) United States Patent
Gothmann et al.

(10) Patent No.: US 12,762,003 B2
(45) Date of Patent: Oct. 13, 2026

(54) PANIC LEVEL MANAGER

(71) Applicant: T-Mobile Innovations LLC, Overland Park, KS (US)

(72) Inventors: Tyler Gothmann, Renton, WA (US); Vladimir Pilipenko, Bellevue, WA (US)

(73) Assignee: T-Mobile Innovations LLC

( * ) Notice: Subject to any disclaimer, the term of this patent is extended or adjusted under 35 U.S.C. 154(b) by 4 days.

(21) Appl. No.: 18/945,082

(22) Filed: Nov. 12, 2024

(65) Prior Publication Data

US 2026/0133868 A1 May 14, 2026

(51) Int. Cl.

*G06F 11/00* (2006.01)
*G06F 11/07* (2006.01)
*G06F 21/60* (2013.01)

(52) U.S. Cl.

CPC .......... *G06F 11/079* (2013.01); *G06F 21/602* (2013.01)

(58) Field of Classification Search

None

See application file for complete search history.

(56) References Cited

U.S. PATENT DOCUMENTS

| | | | | |
|---|---|---|---|---|
| 6,360,366 | B1 * | 3/2002 | Heath | G06F 8/65 709/201 |
| 2004/0268176 | A1 * | 12/2004 | Greenlee | G06F 11/3495 714/4.2 |
| 2010/0042675 | A1 * | 2/2010 | Fujii | G06F 9/505 709/203 |
| 2014/0173578 | A1 * | 6/2014 | Ku | G06F 8/656 717/169 |
| 2016/0098577 | A1 * | 4/2016 | Lacey | G06F 21/6263 726/28 |
| 2017/0091008 | A1 * | 3/2017 | Cherbakov | G06F 11/0742 |

OTHER PUBLICATIONS

Google Scholar/Patents search—text refined (Year: 2026).*

* cited by examiner

*Primary Examiner* — Christopher S Mccarthy

(57) ABSTRACT

Methods, systems, and apparatus, including computer programs encoded on a computer storage medium, for managing the panic level of a device are disclosed. In one aspect, a method includes the actions of generating first diagnostic data that is associated with the computing device. The actions further include transmitting, to a server, the first diagnostic data. The actions further include receiving, from the server, an error response that indicates an error occurred because of transmitting the first diagnostic data. The actions further include, in response to receiving the error response, ceasing transmitting, to the server, second diagnostic data that is associated with the computing device.

19 Claims, 9 Drawing Sheets

PANIC LEVEL MANAGER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Devices may be configured to periodically generate diagnostic data that may indicate various characteristics of the device. The devices may output this diagnostic data to a server.

SUMMARY

An innovative aspect of the subject matter described in this specification may be implemented in methods for generating, by an application of a computing device, first diagnostic data that is associated with the computing device; transmitting, by the application of the computing device and to a server, the first diagnostic data; receiving, by the application of the computing device and from the server, an error response that indicates an error occurred because of transmitting the first diagnostic data; and, in response to receiving the error response, ceasing, by the application of the computing device, transmitting, to the server, second diagnostic data that is associated with the computing device.

Other implementations of this aspect include corresponding systems, apparatus, and computer programs recorded on computer storage devices, each configured to perform the operations of the method.

Another innovative aspect of the subject matter described in this specification may be implemented in methods for preventing a computing device from outputting sensitive data in response to receiving an error response from a server and while the computing device is unable to receive software updates. The method includes generating, by a headless application of the computing device, first personally identifiable information; storing, by the headless application of the computing device, the first personally identifiable information in a diagnostic data storage medium of the computing device; determining, by the headless application of the computing device, a first panic level that indicates to transmit the first personally identifiable information to a server and a first temporal frequency for the headless application to send the first personally identifiable information to the server; based on satisfying the first temporal frequency, transmitting, by the headless application of the computing device and to the server, the first personally identifiable information; receiving, by the headless application of the computing device and from the server, a first error response that indicates an error occurred because of transmitting the first personally identifiable information; based on receiving the first error response, incrementing, by the headless application of the computing device, an error response count that indicates a number of error responses received from the server; comparing, by the headless application of the computing device, the first error response count received from the server to a first error response count threshold; based on comparing the first error response count to the first error response count threshold, determining, by the headless application of the computing device, that the error response count satisfies the first error response count threshold; based on determining that the error response count satisfies the first error response count threshold, updating, by the headless application of the computing device, the first panic level to a second panic level that indicates to cease transmitting second personally identifiable information and indicates to transmit heartbeat data to the server and a second temporal frequency for the headless application to send the heartbeat data to the server; based on satisfying the second temporal frequency, transmitting, by the headless application of the computing device and to the server, the heartbeat data; receiving, by the headless application of the computing device and from the server, a second error response that indicates an error occurred because of transmitting the heartbeat data; based on receiving the second error response, incrementing, by the headless application of the computing device, the error response count; comparing, by the headless application of the computing device, the error response count received from the server to a second error response count threshold; based on comparing the error response count to the second error response count threshold, determining, by the headless application of the computing device, that the error response count satisfies the second error response count threshold; and based on determining that the error response count satisfies the second error response count threshold, updating, by the headless application of the computing device, the second panic level to a third panic level that indicates to cease transmitting additional heartbeat data to the server.

Other implementations of this aspect include corresponding systems, apparatus, and computer programs recorded on computer storage devices, each configured to perform the operations of the method.

Another innovative aspect of the subject matter described in this specification may be implemented in methods for limiting transmitting sensitive data to a zombie server. The method includes generating, by an application of a computing device, first sensitive data that is associated with the computing device; transmitting, by the application of the computing device and to the zombie server that is configured to transmit an error message in response to receiving any type of data, the first sensitive data; receiving, by the application of the computing device and from the zombie server, a first error response; based on receiving the first error response, incrementing, by the application of the computing device, an error response count that indicates a number of error responses received from the zombie server; comparing, by the application of the computing device, the first error response count received from the server to a first error response count threshold; based on comparing the first error response count to the first error response count threshold, determining, by the headless application of the computing device, that the error response count does not satisfy the first error response count threshold; based on determining that the error response count does not satisfy the first error response count threshold, generating, by the application of a computing device, second sensitive data that is associated with the computing device; and transmitting, by the application of the computing device and to the zombie server, the second sensitive data.

Other implementations of this aspect include corresponding systems, apparatus, and computer programs recorded on computer storage devices, each configured to perform the operations of the method.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
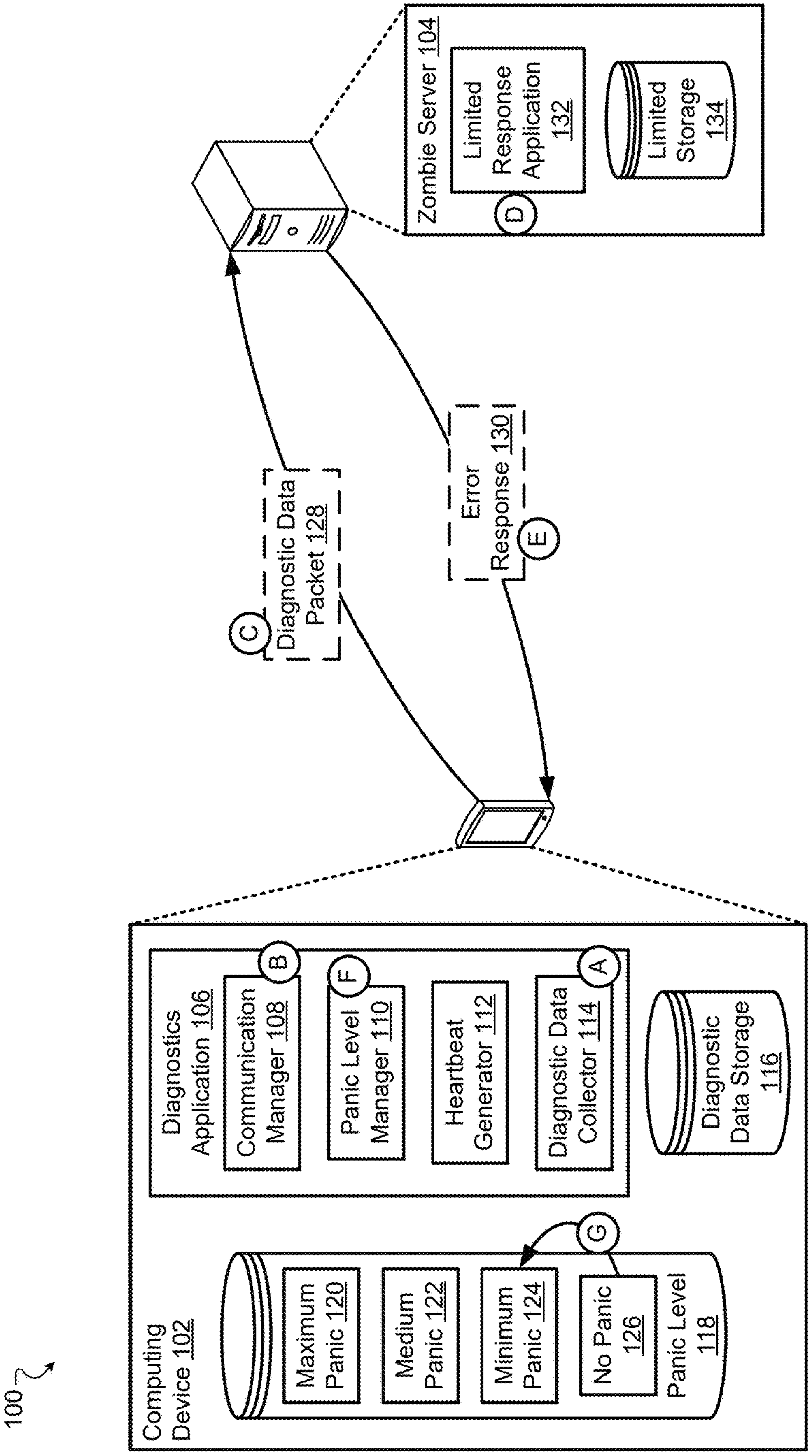
FIG. 1 illustrates an example system that is configured to adjust the panic level of a computing device in response to receiving error responses from a server.

It should be understood at the outset that although illustrative implementations of one or more implementations are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile network operators provide service to millions of devices, sometimes hundreds of millions of devices. Ensuring that the software on each one of those devices is up to date can be challenging. Sometimes a user may forget about a device. Some devices may be lost. Because of the location of some of these forgotten or lost devices, it may be challenging for the mobile network operator to provide a software update. For example, some devices may be forgotten inside the drawer of a metal desk. Some devices may be lost in an area without network coverage. Some may be unable to maintain a connection with the network that has the bandwidth to receive a software update.

These devices may be a fraction of a percentage of the total number of devices to which a mobile network operator provides service. Nevertheless, these devices do present a security risk to the mobile network operator and those users associated with these devices. Each device to which the mobile network operator provides service may include a diagnostics application. This application may be a headless application because it does not have a user interface. This application may have access to an application programming interface (API) of the operating system, as well as a custom API that allows the application access to modem-level information. The diagnostics application may be configured to periodically collect diagnostics data and transmit that diagnostics data to a server. This diagnostics data may include detailed information about the usage and movement as well as other types of data discussed below. This level of detail may be specific enough to personally identify the user of the device. In other words, the diagnostics data may include personally identifiable information. In some implementations, the diagnostics application may not be specifically configured to collect personal information. Rather, the technical information collected by the diagnostics application may have characteristics that allow a nefarious actor to use the collected data, possibly in combination with other data, to identify different users. Because the diagnostics data may include sensitive and potentially personally identifiable information, it is imperative that the diagnostics application transmit the diagnostics data to the correct server. If a device is unable to receive an update from the mobile network operator, then the mobile network operator may not be able to provide the device with an update regarding a change in the location of the server.

Without receiving an update that includes a change to the location of the server, a device may continue to generate and transmit the sensitive diagnostic data to an old server location, which creates the security risk and may generate unnecessary network traffic. Because of operational requirements, internal policies or requirements, and/or external rules or requirements, a mobile network operator may be unable to completely decommission the old server. The mobile network operator may be required to set up a zombie server that is at the old location. The zombie server may be configured to receive data and output an error response, even when the zombie server successfully received the data. The zombie server may not be configured to store any of the received data.

The goal is for these non-updated devices to successfully receive an update with the new server location. Until that happens, the devices need a way to internally recognize that there is a problem and take action without any outside input. The problem being that the devices are continuing to generate and send sensitive diagnostic data to zombie server. The action being to stop sending sensitive diagnostic data to the zombie server. A device that is unable to receive software updates would be unable to independently determine the location of the new server. Instead, the device should be configured to initiate various panic levels that specify when to generate and transmit the diagnostics data and even when to stop transmitting the diagnostics data all together.

Each time that a non-updated device transmits diagnostics data to the zombie server, the device receives an error message. The device may be configured to track the error message and maintain an error response count. The error response count may indicate the number of consecutive error responses that the device has received in response to outputting its diagnostic data. The device may be configured to compare this error response count to an error response count threshold. If the error response count satisfies the error response count threshold, then the device may internally determine to enter a minimum panic level.

Once the device enters the minimum panic level, the minimum panic level may specify that the device decrease the frequency at which the device generates and transmits the diagnostic data to the zombie server. The device may generate and transmit the diagnostic data to the zombie server at this decreased frequency and continue to receive error responses. The device may continue to increment the error response count and compare the error response count to the next error response count threshold for the next panic level.

The device may continue to increase the panic level until one of two things happens. The first one is that the device may increase the panic level to a maximum panic level. At the maximum panic level, the device may lock itself down and stop transmitting the diagnostics data. The benefit of this result is that the device has stopped outputting the sensitive diagnostics data to the zombie server. The maximum panic level may not be configured to lock the device or block a user from using the device. The second one is that the device is able to receive an update to the server location. After receiving this update, the device will receive a positive acknowledgement from the new server in response to transmitting its diagnostic data. Based on receiving the positive acknowledgement, the device may reset the error response count to zero and reset the panic level to the no panic level. With the panic level reset, the device may return to generating and transmitting the diagnostics data at the typical frequency.

FIG. 1 illustrates an example system 100 that is configured to adjust the panic level of a computing device 102 in response to receiving an error response 130 from a server 104. Briefly, and as described in more detail below, the computing device 102 includes a diagnostics application 106 that is configured to collect and transmit diagnostic data from the computing device 102 to the server 104. The server 104 may be configured to transmit an error response 130 in response to receiving any type of data. When the computing device 102 receives the error response 130, the diagnostics application 106 may update the panic level 118 that indicates the type of data for the diagnostics application 106 to send to the server 104 and the temporal frequency for the diagnostics application 106 to send the data to the server 104. FIG. 1 includes various stages A through G that may illustrate the performance of actions and/or the movement of data between various components of the system 100. The system 100 may perform these stages in any order.

In more detail, the computing device 102 may include a diagnostics application 106. The diagnostics application 106 may be a headless application that does not include a user interface. The diagnostics application 106 may be configured to collect diagnostics data from the computing device 102 and store the diagnostics data in the diagnostics data storage 116. The diagnostics data storage 116 may be a data storage device that is located on the computing device 102.

The diagnostics application 106 may be configured to manage the panic level 118 of the computing device 102. The panic level 118 may specify a type of data for the diagnostics application 106 to collect, a frequency for the diagnostics application 106 to collect the type of data, a frequency for the diagnostics application 106 to transmit the data to the server 104, an amount of diagnostics data for the diagnostics application 106 to store in the diagnostics data storage 116, whether to delete the diagnostics data in the diagnostics data storage 116, and/or any other similar data collection or transmission parameter.

For example, the no panic level 126 may specify for the diagnostics application 106 to collect diagnostics data every six hours and to store two weeks of diagnostics data in the diagnostics data storage 116. The no panic level 126 may also specify to collect all types of diagnostic data and to transmit the diagnostics data once per day. The no panic level 126 may also specify to generate and transmit a heartbeat signal once per hour. The heartbeat signal may include the International Mobile Equipment Identity (IMEI) of the computing device 102 and a timestamp. In some implementations, the heartbeat signal may not include any additional information. In some implementations, at the no panic level 126, the diagnostics application 106 may collect the full diagnostics data set, store data for ten days, transmit data to the server 104 once per day, and send a heartbeat signal once per hour.

The minimum panic level 124 may specify for the diagnostics application 106 to collect a subset of diagnostic data that the diagnostics application 106 is configured to collect and to transmit the diagnostics data once every two days. The minimum panic level 124 may also specify to store four days of diagnostics data in the diagnostics data storage 116. The minimum panic level 124 may also specify to generate and transmit a heartbeat signal once per hour. In some implementations, at the minimum panic level 124, the diagnostics application 106 may collect limited data of the diagnostics data set, store data for three days, transmit data to the server 104 once per three days, and send a heartbeat signal once per day.

The medium panic level 122 may specify for the diagnostics application 106 to cease collecting diagnostic data and to cease transmitting the diagnostic data. The medium panic level 122 may also specify to delete the diagnostics data in the diagnostics data storage 116. The medium panic level 122 may also specify to generate and transmit a heartbeat signal once per day. In some implementations, at the medium panic level 122, the diagnostics application 106 may collect only critical data of the diagnostics data set as part of the heartbeat signal that is sent once per week.

The maximum panic level 120 may specify for the diagnostics application 106 to cease collecting diagnostic data and to cease transmitting the diagnostic data. The maximum panic level 120 may also specify to delete the diagnostics data in the diagnostics data storage 116. The maximum panic level 120 may also specify to cease generation and transmission of a heartbeat signal. In some implementations, at the maximum panic level 120, the diagnostics application 106 may stop all activates, services and network operations related to diagnostics data collection.

The diagnostics application 106 may include a diagnostics data collector 114. The diagnostics data collector 114 may be configured to collect the diagnostics data of the computing device 102. The diagnostics data collector 114 may utilize an application programming interface (API) of the operating system of the computing device 102 to collect the diagnostics data. In some implementations, the diagnostics application 106 may have access to a custom API that allows the diagnostics application 106 to access data from the modem level of the computing device 102. With the API of the operating system and the custom API, the diagnostics application 106 may be configured to collect battery information, Wi-Fi information, dropped call information, location information, signal strength, system crashes, network usage data, application usage data, packet loss, 5G information, session initiation protocol (SIP) values, information related to the negotiations between the network and the computing device 102, and/or any other similar type of diagnostics data.

In stage A, the diagnostics data collector 114 may communicate with the panic level manager 110 to determine the panic level 118 and the corresponding communication instructions for that panic level. The panic level manager 110 may determine that the panic level 118 is the no panic level 126. In this case, the diagnostics data collector 114 may collect diagnostic data using the API of the operating system and the custom API. The diagnostics data collector 114 may store the diagnostic data in the diagnostics data storage 116 along with a timestamp that indicates the date and time when the diagnostics data collector 114 collected the diagnostics data. The diagnostics data collector 114 may collect diagnostic data every six hours as specified by the no panic level 126.

The diagnostics application 106 may include a communication manager 108. The communication manager 108 may be configured to generate and transmit diagnostic data packets to the server 104. The communication manager 108 may access the diagnostic data storage 116 and include the data from the diagnostic data storage 116 in the diagnostic data packet 128. The communication manager 108 may also include instructions identifying the server 104. The diagnostics application 106 may communicate with the panic level manager 110 to determine the panic level. The panic level manager 110 may provide the communication manager 108 with instructions related to what data from the diagnostic data storage 116 to include in diagnostic data packets, how often to generate diagnostic data packets, and how often to send diagnostic data packets to the server 104.

In stage B, the communication manager 108 may communicate with the panic level manager 110 to determine the panic level 118 and the corresponding communication instructions for that panic level. The panic level manager 110 may determine that the panic level 118 is the no panic level 126. In this case, the communication manager 108 may generate and transmit diagnostic data packets once per day. The communication manager 108 may access the diagnostic data storage 116 and include in the diagnostic data packet 128 the diagnostic data added to the diagnostic data storage 116 since the communication manager 108 last generated a diagnostic data packet, or, in this case, the past twenty-four hours.

In stage C, the communication manager 108 transmits the diagnostic data packet 128 to the server 104. In some implementations, the communication manager 108 transmits the diagnostic data packet 128 over a Wi-Fi connection or a cellular connection. In some implementations, the communication manager 108 generates multiple smaller packets with the contents of the diagnostic data packet 128 and transmits those smaller packets to the server 104. The communication manager 108 may transmit the diagnostic data packet 128 in response to generating the diagnostic data packet 128 or according to a schedule specified by the panic level 118.

The server 104 may receive the diagnostic data packet 128. The server 104 may be referred to as a zombie server 104 because the server 104 has limited functionality. The server 104 may be configured to receive data and output an error message in response to receiving the data. The server 104 may have limited functionality because of operational requirements of the network operator that provides network service to the computing device 102. The operational requirements may specify that the server 104 be able to receive data, output an error response, and not store the received data.

The server 104 may include a limited response application 132. The limited response application 132 may be configured to receive communications from various computing devices. The communications may be similar to the diagnostic data packet 128, a heartbeat signal, and/or any other similar type of data. The limited response application 132 may be configured to store some of the data received in the limited storage 134. In some implementations, the limited response application 132 is configured to bypass storing any of the received data in the limited storage 134 and not store any of the received data in the limited storage 134. In this case, the limited response application 132 may receive data and delete the data. In some implementations, the limited storage 134 may not include sufficient storage to store any data received by the server 104.

The limited response application 132 may be configured to provide a response based on receiving the data. The response may indicate an error occurred during receiving the data. The response may be in the 400 or 500 class of codes of the Hypertext Transfer Protocol (HTTP). For example, the response may be a 500 response or a 400 response. The limited response application 132 may be performing as intended even when returning a 400 or 500 response or other type of error response. The 400 or 500 response or other type of error response may be intended as a signal to attempt to limit communications with the server 104.

In stage D, the limited response application 132 receives the diagnostic data packet 128 from the computing device 102. The limited response application 132 may perform limited or no processing on the diagnostic data packet 128. The limited response application 132 may bypass storing the diagnostic data packet 128 in the limited storage 134. The decision whether to store the diagnostic data packet 128 in the limited storage 134 may be based on analyzing the contents of the diagnostic data packet 128 or may be automatic and not based on analyzing the contents of the diagnostic data packet 128.

The limited response application 132 may generate the error response 130 in response to receiving the diagnostic data packet 128. The decision to generate the error response may be based on analyzing the contents of the diagnostic data packet 128 or may be automatic and not based on analyzing the contents of the diagnostic data packet 128.

In stage E, the limited response application 132 may generate and output the error response 130 in response to receiving the diagnostic data packet 128. The communication manager 108 may receive the error response 130 and provide data to the panic level manager 110 indicating that the communication manager 108 received the error response 130. Based on receiving the notice of the error response 130, the panic level manager 110 may determine whether to update the panic level 118. The decision of the panic level manager 110 and the inner workings of the panic level manager 110 will be discussed below in relation to FIG. 2. To summarize, the panic level manager 110 may compare the error response count that indicates the number of error responses received from the server 104 to one or more error response count thresholds. Based on the comparison, the panic level manager 110 may determine to update the panic level to a higher or lower panic level or maintain the panic level.

In some implementations, the communication manager 108 may receive a response other than an error response. For example, the communication manager 108 may receive a 200-type response that indicates a successful transmission to the server 104 or another server. In this case, the communication manager 108 may provide data indicating the 200-type response to the panic level manager 110. The panic level manager 110 may update the panic level 118 to the no panic level 126.

In stage F, the panic level manager 110 may receive an indication of the error response 130 from the communication manager 108. The panic level manager 110 may increment an error response count and compare the error response count to an error response count threshold. For example, the panic level manager 110 may increment the error response count to ten, which indicates that the computing device 102 has received ten consecutive error responses. The panic level manager 110 may compare the ten consecutive error responses to the error response count threshold of ten consecutive error responses. The panic level manager 110 may determine that the error response count satisfies the error response count threshold.

In stage G, the panic level manager 110 may update the panic level 118 to the minimum panic level 124. In response to updating the panic level 118, the panic level manager 110 may provide notice to the diagnostic data collector 114, the heartbeat generator 112, and/or any other component of the computing device 102. Based on the updated panic level 118, the diagnostic data collector 114 may update the timing of its data collection, and the heartbeat generator 112 may update the timing of its heartbeat generation.

The heartbeat generator 112 may be configured to generate a heartbeat of the computing device 102. The heartbeat signal may be a limited communication that includes the IMEI of the computing device 102 and a timestamp. In some implementations, the heartbeat signal may include data indicating a location of the computing device 102 and/or any other type of information related to the status of the computing device 102.

The heartbeat generator 112 may generate a heartbeat signal and provide the heartbeat signal to the communication manager 108 for transmission to the server 104 and/or another recipient. The frequency with which the heartbeat generator 112 generates a heartbeat signal may be dictated by the panic level 118. For example, at the no panic level 126, the heartbeat generator 112 may generate a heartbeat signal every two hours. At the minimum panic level 124, the heartbeat generator 112 may generate a heartbeat signal every six hours. At the minimum panic level 124, the heartbeat generator 112 may generate a heartbeat signal every twenty-four hours. At the minimum panic level 124, the heartbeat generator 112 may bypass generating a heartbeat signal, resulting in no heartbeat signal being generated.

Figure 2:
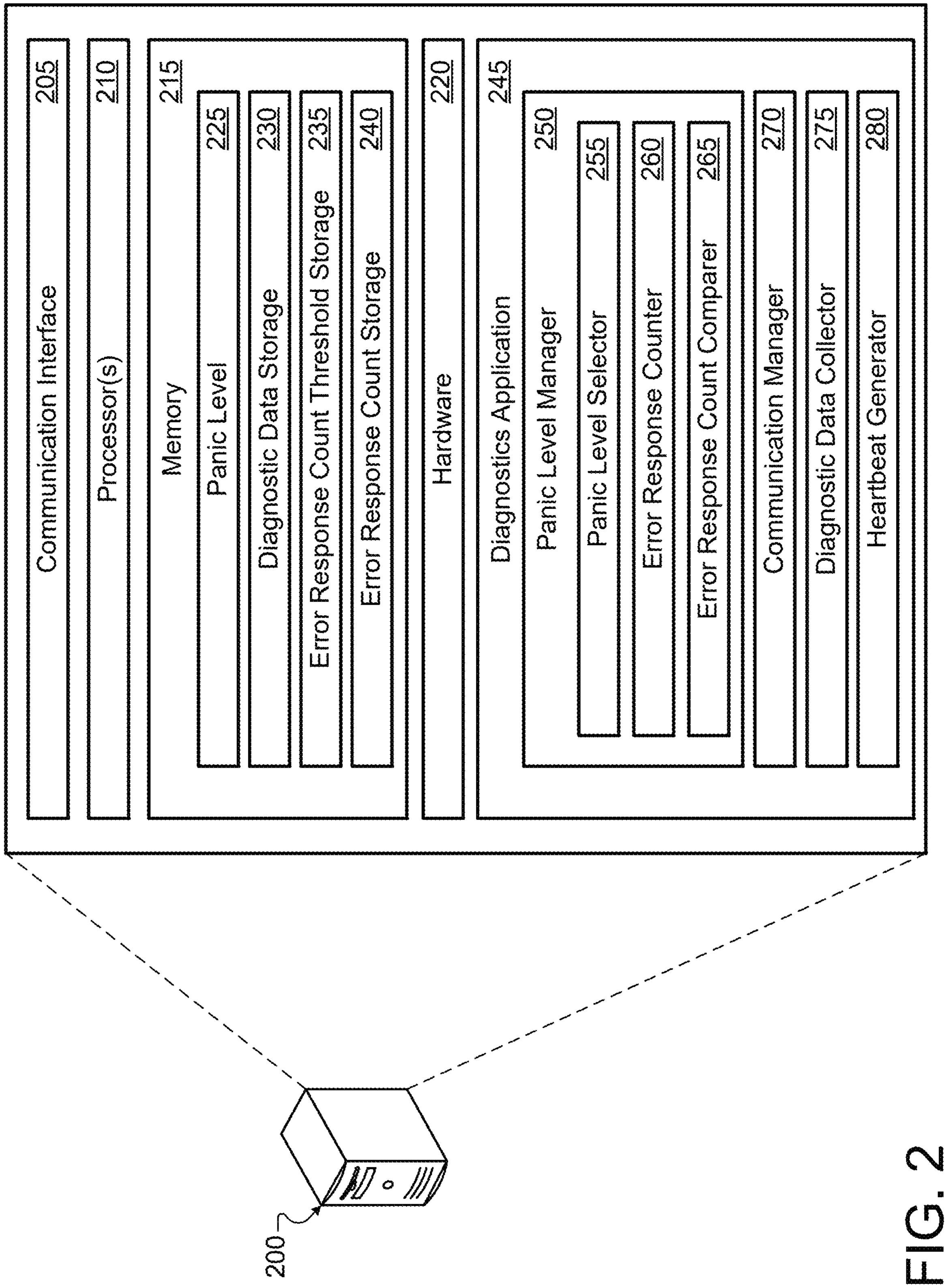
FIG. 2 illustrates various layers of an example computing system for adjusting the panic level of a computing device in response to receiving error responses from a server.

FIG. 2 illustrates various layers of an example computing system 200 for adjusting the panic level of a computing device in response to receiving error responses from a server. The device 200 may be any type of computing device that is configured to communicate with other computing devices. The device 200 may communicate with other computing devices using a wide area network, a local area network, the internet, a wired connection, a wireless connection, and/or any other type of network or connection. The wireless connections may include cellular, Wi-Fi, short-range radio, infrared, and/or any other wireless connection. The device 200 may be similar to the computing device 102 of FIG. 1. Some of the components of the device may be implemented in a single computing device or distributed over multiple computing devices. Some of the components may be in the form of virtual machines or software containers that are hosted in a cloud in communication with disaggregated storage devices.

The device 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate over a wide area network, a local area network, the internet, a wired connection, a wireless connection, and/or any other type of network or connection. The wireless connections may include cellular, Wi-Fi, short-range radio, infrared, and/or any other wireless connection.

The hardware 220 may include user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In some implementations, the data stored in the memory 215 may be stored externally from the server 200.

The one or more processors 210 may implement, through the execution of computer-executable instructions stored in the memory 215, a diagnostics application 245. The diagnostics application 245 may be similar to the diagnostics application 106 of FIG. 1. The diagnostics application 245 may be a headless application that is configured to collect and output diagnostics data associated with the device 200. The diagnostics application 245 may collect and output diagnostics data based on the panic level 225 that may be similar to the panic level 118 of FIG. 1.

The diagnostics application 245 may include several components. One of the components may include the panic level manager 250. The panic level manager 250 may be similar to the panic level manager 110. The panic level manager 250 may be configured to determine and set the panic level 118. The panic level manager 250 may include several components itself. One of the components may be the error response counter 260. The error response counter 260 may be configured to maintain the error response count in the error response count storage 240. The error response count may indicate a number of consecutive error responses that the device 200 has received in response to outputting data.

The error response counter 260 may receive an indication that the device 200 received an error response from a server. Based on receiving the indication of the error response, the error response counter 260 may increment the error response count in the error response count storage 240. In some implementations, the error response counter 260 may include, in the error response count, the date and time that the device 200 received the error response, the date and time of the last non-error response, such as a 2-type response, previous numbers of consecutive error responses before other non-error response, and/or any other similar type of data. In some implementations, the error response counter 260 may maintain and increment the error response count and reset the error response count to zero when the device 200 receives a non-error response. In some implementations, the error response counter 260 may store different error response counts for different types of outputted data. For example, the error response counter 260 may maintain an error response count for diagnostic data, an error response count for heartbeat signals, and/or any other type of output data.

The diagnostics application 245 may also include an error response count comparer 265. The error response count comparer 265 may be configured to compare the error response count in the error response count storage 240 to the error response count threshold 235. The error response count threshold storage 235 may include multiple error response count thresholds. The multiple error response count thresholds may correspond to different panic levels. For example, an error response count threshold of ten may be the threshold to transition from the no panic level to the minimum panic level. An error response count threshold of twenty may be the threshold to transition from the minimum panic level to the medium panic level. An error response count threshold of thirty may be the threshold to transition from the medium panic level to the maximum panic level.

The error response count comparer 265 may access the panic level 225 to determine the appropriate threshold in the error response count threshold storage 235. The error response count comparer 265 may access the error response count in the error response count storage 240 and compare the error response count to the selected error response count threshold. The error response count comparer 265 may provide the panic level manager 250 data indicating whether the error response count satisfied the error response count threshold. The error response count may satisfy the error response count threshold if the error response count is greater than or greater than or equal to the error response count threshold.

In some implementations, the error response count threshold storage 235 may include multiple error response count thresholds for different types of sent data. For example, some error response count thresholds may specify an error response count threshold for heartbeat signals. Other error response count thresholds may specify an error response count threshold for diagnostic data. The different panic levels 225 may have different error response count thresholds for different data to determine when to change to the next panic level.

As an example, the error response count comparer 265 may access the panic level 225 and determine that the panic level is the minimum panic level. The error response count comparer 265 may access the corresponding error response count thresholds from the error response count threshold storage 235. The corresponding error response count thresholds may be twenty for heartbeat signals and ten for diagnostics data. The error response counts may be twenty-one for heartbeat signals and seven for diagnostics data. The error response count comparer 265 may compare twenty-one to twenty and determine that the error response count for heartbeat signals satisfies the error response count threshold for heartbeat signals. The error response count comparer 265 may compare seven to ten and determine that the error response count for diagnostics data does not satisfy the error response count threshold for diagnostics data. The error response count comparer 265 may provide these results to the panic level selector 255.

The diagnostics application 245 may also include the panic level selector 255. The panic level selector 255 may be configured to determine when to increase the panic level 225, decrease the panic level 225, maintain the panic level 225, or drop the panic level 225 back to the no panic level. The panic level selector 255 may receive an indication from the error response count comparer 265 whether the error response count satisfies the error response count threshold. Based on whether the error response count satisfies the error response count threshold, the panic level selector 255 may increase the panic level 225 or maintain the panic level 225. If the error response count satisfies the error response count threshold, then the panic level selector 255 may increase the panic level 225. If the error response count does not satisfy the error response count threshold, then the panic level selector 255 may maintain the panic level 225. In the case where there are multiple error response count thresholds for different types of data, the panic level selector 255 may determine to increase the panic level based on one or both of the error response counts satisfying its respective error response count threshold.

The panic level selector 255 may also be configured to drop the panic level 225 back to the no panic level in the event of receiving an indication of the communication manager 270 receiving a 200-type response from a server. The communication manager 270 may be another component included in the diagnostics application 245. The one or more processors 210 may implement, through the execution of computer-executable instructions stored in the memory 215, communication manager 270. The communication manager 270 may be similar to the communication manager 108 of FIG. 1. The communication manager 270 may be configured to provide data and receive data from a server. The location, or address, of the server may be stored in the memory 215. The communication manager 270 may provide an indication of the data received to the panic level manager 250 and receive data to output from the diagnostic data collector 275 and the heartbeat generator 280.

The diagnostic data collector 275 may be another component included in the diagnostics application 245. The one or more processors 210 may implement, through the execution of computer-executable instructions stored in the memory 215, diagnostic data collector 275. The diagnostic data collector 275 may be similar to the diagnostic data collector 114 of FIG. 1. The diagnostic data collector 275 may be configured to collect diagnostic data related to the device 200 and provide that data to the communication manager 108 for output. The diagnostic data collector 275 may access the panic level 225 to determine a frequency to collect the diagnostic data. In some implementations, the diagnostic data collector 275 may collect the same type of diagnostic data independent of the panic level 225. In some implementations, the diagnostic data collector 275 may collect different types of data depending on the panic level 225. For example, the diagnostic data collector 275 may collect modem-level data if the panic level 225 is the no panic level and may bypass collecting the modem-level data if the panic level 225 is the minimum panic level or higher.

The diagnostic data collector 275 may also store the diagnostics data in the diagnostics data storage 230. The diagnostics data storage 230 may be similar to the diagnostics data storage 116 of FIG. 1 and may be located in the memory 215. The diagnostic data collector 275 may collect and store the diagnostics data after or during collection of the diagnostics data. The diagnostic data collector 275 may store an amount of diagnostics data based on the panic level 225. For example, the diagnostic data collector 275 may store three days'worth of diagnostics data in the diagnostics data storage 230 if the panic level 225 is the no panic level. The diagnostic data collector 275 may store one day's worth of diagnostics data in the diagnostics data storage 230 if the panic level 225 is the medium panic level. The diagnostic data collector 275 may store no diagnostics data in the diagnostics data storage 230 if the panic level 225 is the maximum panic level. The diagnostic data collector 275 may delete data from the diagnostics data storage 230 to ensure the appropriate amount of diagnostics data is stored in the diagnostics data storage 230.

The heartbeat generator 280 may be another component included in the diagnostics application 245. The one or more processors 210 may implement, through the execution of computer-executable instructions stored in the memory 215, heartbeat generator 280. The heartbeat generator 280 may be similar to the heartbeat generator 112 of FIG. 1. The heartbeat generator 280 may be configured to generate a heartbeat signal. The heartbeat signal may include a time-stamp, the IMEI of the device 200, and/or any other similar information.

The heartbeat generator 280 may access the panic level 225 to determine a frequency to generate the heartbeat signal. For example, the heartbeat generator 280 may generate heartbeat signals every thirty minutes if the panic level 225 is the no panic level. The heartbeat generator 280 may generate heartbeat signals every thirty minutes if the panic level 225 is the no panic level. The heartbeat generator 280 may generate heartbeat signals every four hours if the panic level 225 is the medium panic level. The heartbeat generator 280 may stop generating heartbeat signals if the panic level 225 is the maximum panic level.

Figure 3:
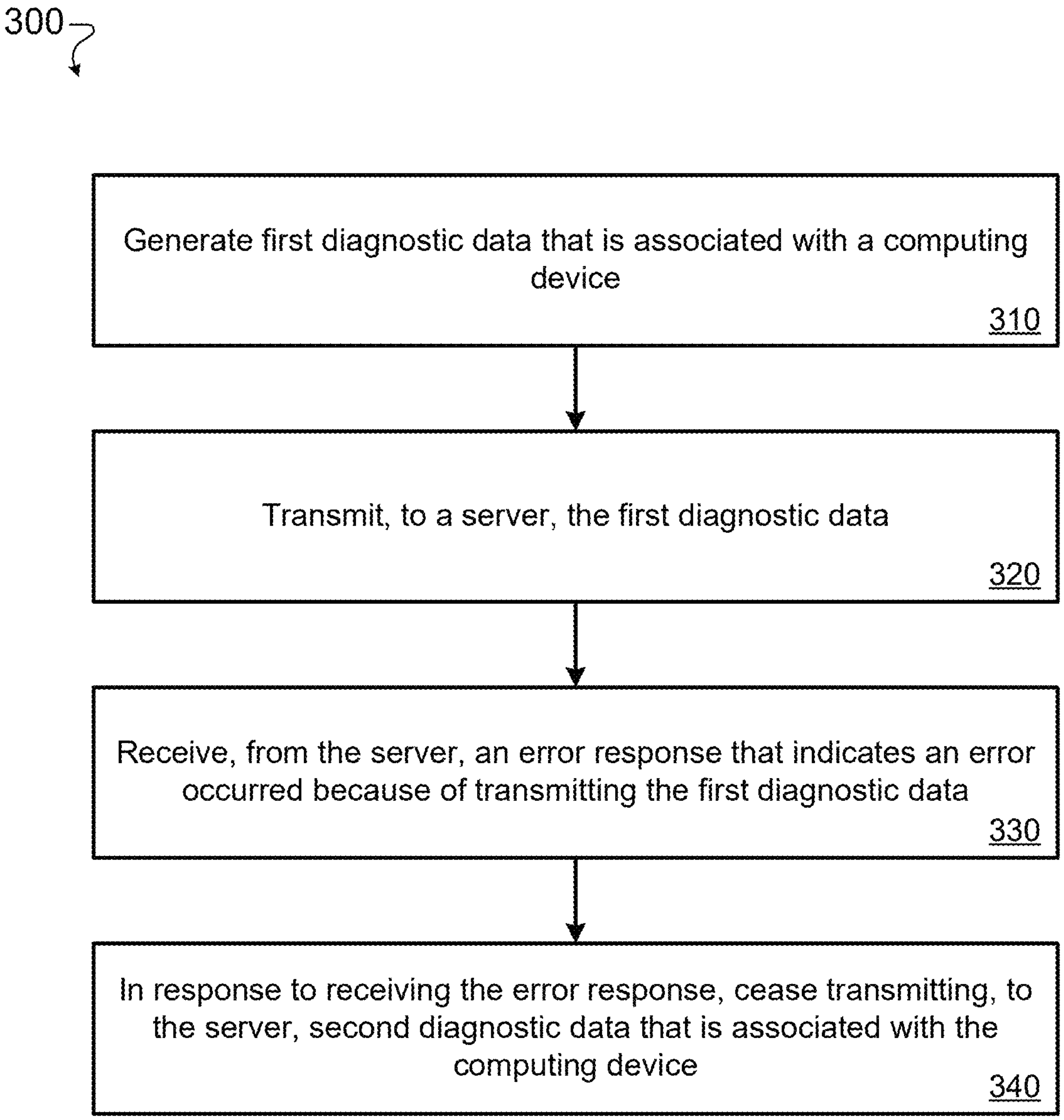
FIG. 3 is a flowchart of an example process for preventing diagnostic data from being transmitted to a server that does not process the diagnostic data.

FIG. 3 is a flowchart of an example process 300 for preventing diagnostic data from being transmitted to a server that does not process the diagnostic data. In general, the process 300 generates diagnostic data related to a computing device and transmits the diagnostic data to a server. After transmitting the diagnostic data, the process 300 receives a response from the server. Based on the response from the server, the process 300 stops generating and transmitting additional diagnostic data. The process 300 will be described as being performed by the computing device 102 and will include references to other components in FIG. 1. In some implementations, the process 300 may be performed by the device 200 of FIG. 2, the system 480 of FIG. 4, the user equipment 500 of FIG. 5, and/or the user equipment 600 of FIG. 6, each of which are discussed below. The process 300 may be performed by a single computing device, which may be a virtual device and/or split across multiple computing devices that may include virtual devices. In some implementations, the process 300 may be performed by an application that is running on the computing device. This application may be a headless application.

The computing device 102 generates first diagnostic data that is associated with the computing device (310). The computing device 102 may generate the first diagnostic data using an API of the operating system and/or a custom API that allows the computing device 102 to access data at the modem level. The diagnostic data may include battery information, Wi-Fi information, dropped call information, location information, signal strength, system crashes, network usage data, application usage data, packet loss, 5G information, information related to the negotiations between the network and the computing device 102, and/or any other similar type of diagnostics data. In some implementations, some of this diagnostic data may include personally identifiable information.

In some implementations, the computing device 102 may access a panic level 118 of the computing device 102. Based on the panic level 118, the computing device 102 may determine when to generate the first diagnostic data. For example, if the panic level 118 is the no panic level 126, then the computing device 102 may generate the first diagnostic data six hours after generating the previous diagnostic data. If the panic level 118 is the minimum panic level 124, then the computing device 102 may generate the first diagnostic data twenty-four hours after generating the previous diagnostic data.

The computing device 102 transmits, to a server 104, the first diagnostic data (320). In some implementations, the computing device 102 may encrypt the first diagnostic data before transmitting the first diagnostic data to the server 104. Encrypting the diagnostic data may help protect the diagnostic data before, during, and/or after transmitting the data to the server 104. However, encryption alone may be insufficient to ensure that a nefarious actor is unable to access the diagnostic data. In some implementations, the computing device 102 may store the first diagnostic data on the computing device 102.

The computing device 102 receiving, by the application of the computing device and from the server 104, an error response 130 that indicates an error occurred because of transmitting the first diagnostic data (330). The server 104 may be a zombie server 104 that is configured to output an error response in response to receiving any type of data. The server 104 may have a limited amount of storage 134 that is inadequate to store the first diagnostic data. The server 104 may be configured to receive data and then delete the data. The server 104 may exist because of an operational requirement of the network operator that provides service to the computing device 102. The operational requirement may specify that the location of the server 104 remain an endpoint that is capable of receiving data. In some implementations, the error response is a 400-type or 500-type response. In some implementations, the computing device 102 may delete any diagnostic data stored on the computing device 102 in response to receiving the error response. The determination of whether to delete the stored diagnostic data may be based on the panic level 118.

In response to receiving the error response 130, the computing device 102 ceases transmitting, to the server 104, second diagnostic data that is associated with the computing device (340). In some implementations, the computing device 102 may also cease generating the second diagnostic data. The second diagnostic data may include the same type of diagnostic data as the first diagnostic data, but captured at a later point in time. The first diagnostic data may reflect time equals zero and the second diagnostic data may reflect time equals one. Similarly, third diagnostic data may include the same type of diagnostic data as the first and second diagnostic data, but captured at a later point in time. The third diagnostic data may reflect time equals two. Additional and/or other diagnostic data may include the same type of diagnostic data as the first, second, and/or third diagnostic data, but captured at another point in time, such as time equals 0.5, 1.5, 2.5, 3, etc. First, second, other, and additional personally identifiable information may reflect personally identifiable information collected at different points in time. First, second, other, and additional sensitive data may reflect sensitive data collected at different points in time.

In some implementations, the computing device 102 may maintain an error response count that indicates a number of consecutive error responses received from the server 104 and/or any other. The computing device 102 may access an error response count threshold that corresponds to the current panic level. The computing device 102 may compare the error response count to the error response count threshold. If the error response count satisfies the error response count threshold, then the computing device 102 may determine to increase the panic level. Based on the increase in the panic level, the computing device 102 may determine to cease generating and/or transmitting any additional diagnostic data to the server 104.

In some implementations, the computing device 102 may generate heartbeat data, or a heartbeat signal. The heartbeat data may include the IMEI of the computing device and a timestamp. The computing device 102 may transmit the heartbeat data to the server 104. The frequency at which the computing device 102 generates and transmits the heartbeat data may be based on the current panic level 118. For example, the computing device 102 may generate and transmit heartbeat data at a frequency of every two hours when the panic level 118 is the no panic level 126. The computing device 102 may generate and transmit heartbeat data at a frequency of every twelve hours when the panic level 118 is the medium panic level 122. The computing device 102 may cease generating and transmitting heartbeat data at a frequency of every twelve hours when the panic level 118 is the maximum panic level 120.

In some implementations, the computing device 102 may receive an acknowledgement, such as a 200-type response, from the server 104 or another server in response to transmitting diagnostic data or heartbeat data. In this case, the computing device 102 may reset the error response counter to zero and reset the panic level 118 to the no panic level 126. The computing device 102 may resume generating and transmitting the diagnostic data and/or the heartbeat data according to the schedule that corresponds to the no panic level 126.

In some implementations, the computing device 102 may receive a software update. The update may include data identifying a new server. The computing device 102 may generate and transmit additional diagnostic data and/or heartbeat data and transmit those to the new server. The new server receives the additional diagnostic data and/or heartbeat data and transmits a reply to the computing device 102. If the reply is an error response, then the computing device 102 increments the error response count and determines whether the error response count satisfies the error response count threshold for the current panic level. If the reply is an acknowledgement, then the computing device 102 resets the error response count to zero and resets the panic level 118 to the no panic level 126.

Figure 4:
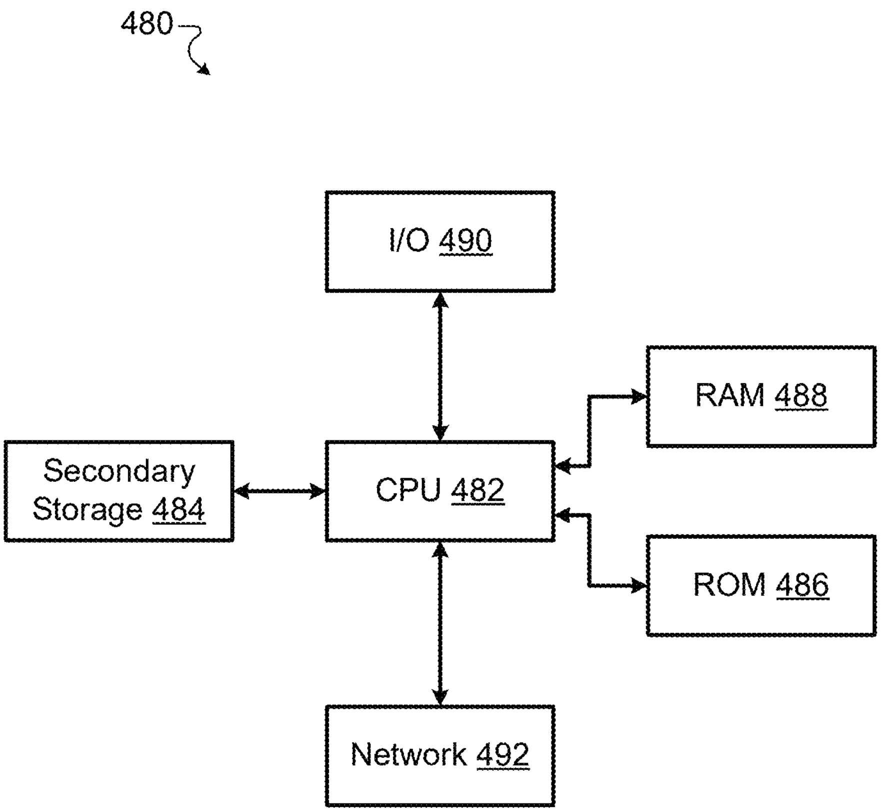
FIG. 4 illustrates an example computer system.

FIG. 4 illustrates an example computer system 480 suitable for implementing one or more implementations disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 480 is turned on or booted, the CPU 482 may execute a computer program or application. For example, the CPU 482 may execute software or firmware stored in the ROM 486 or stored in the RAM 488. In some cases, on boot and/or when the application is initiated, the CPU 482 may copy the application or portions of the application from the secondary storage 484 to the RAM 488 or to memory space within the CPU 482 itself, and the CPU 482 may then execute instructions that the application is comprised of. In some cases, the CPU 482 may copy the application or portions of the application from memory accessed via the network connectivity devices 492 or via the I/O devices 490 to the RAM 488 or to memory space within the CPU 482, and the CPU 482 may then execute instructions that the application is comprised of. During execution, an application may load instructions into the CPU 482, for example load some of the instructions of the application into a cache of the CPU 482. In some contexts, an application that is executed may be said to configure the CPU 482 to do something, e.g., to configure the CPU 482 to perform the function or functions promoted by the subject application. When the CPU 482 is configured in this way by the application, the CPU 482 becomes a specific purpose computer or a specific purpose machine.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage

484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 492 may provide wired communication links and/or wireless communication links (e.g., a first network connectivity device 492 may provide a wired communication link and a second network connectivity device 492 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In some implementations, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk-based systems may all be considered secondary storage 484), flash drive, ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In some implementations, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some implementations, virtualization software may be employed by the computer system 480 to provide the functionality of a number of servers that is not directly bound to the number of computers in the computer system 480. For example, virtualization software may provide twenty virtual servers on four physical computers. In some implementations, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In some implementations, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data structures in part by directly accessing the computer program product, for example by reading from a CD-ROM disk inserted into a disk drive peripheral of the computer system 480. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

In some contexts, the secondary storage 484, the ROM 486, and the RAM 488 may be referred to as a non-transitory computer readable medium or a computer readable storage media. A dynamic RAM implementation of the RAM 488, likewise, may be referred to as a non-transitory computer readable medium in that while the dynamic RAM receives electrical power and is operated in accordance with its design, for example during a period of time during which the computer system 480 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

Figure 5:
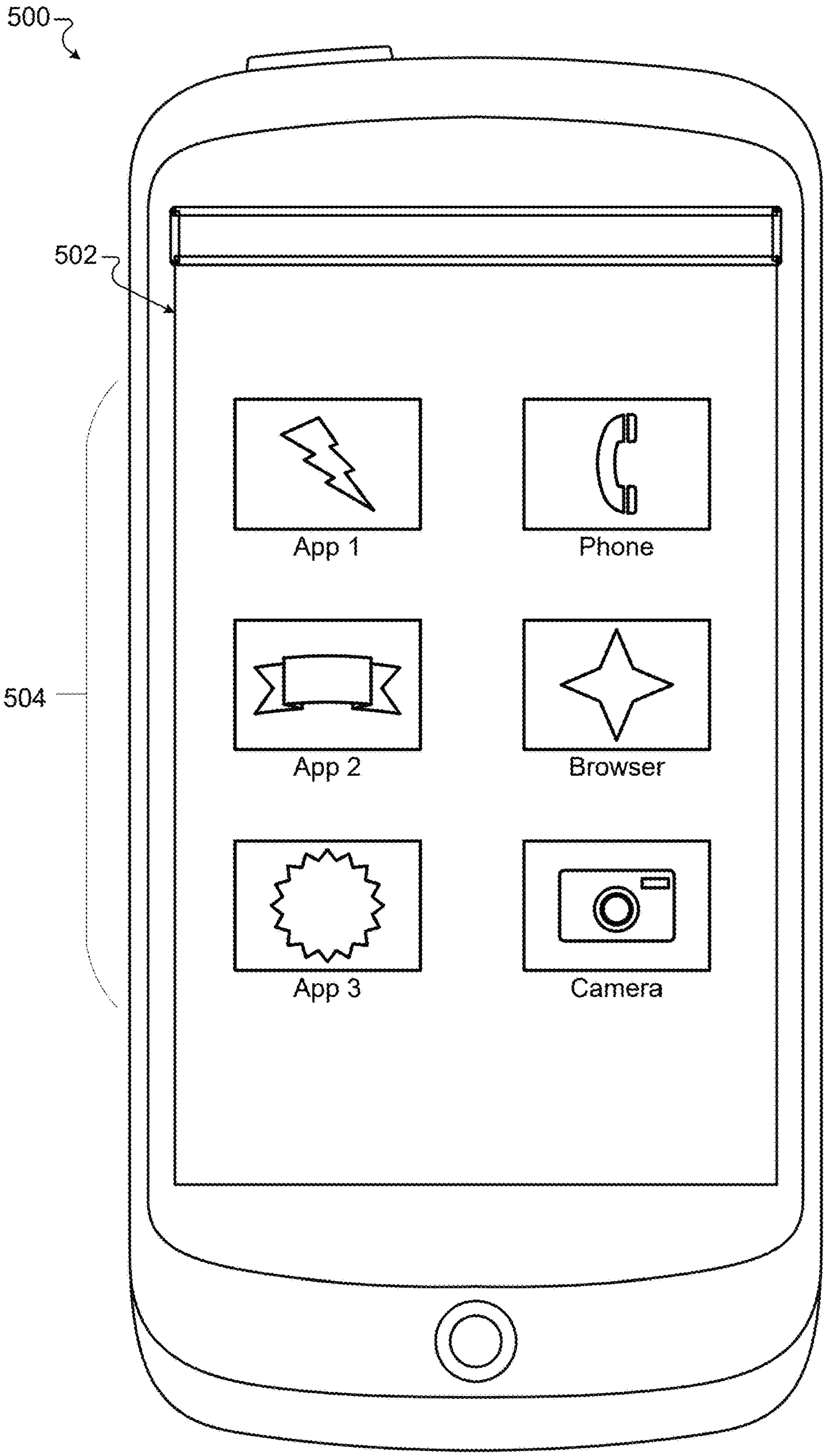
FIG. 5 illustrates an example user equipment.

FIG. 5 depicts the user equipment (UE) 500, which is operable for implementing aspects of the present disclosure, but the present disclosure should not be limited to these implementations. Though illustrated as a mobile phone, the UE 500 may take various forms including a wireless handset, a pager, a personal digital assistant (PDA), a gaming device, or a media player. The UE 500 includes a touchscreen display 502 having a touch-sensitive surface for input by a user. A small number of application icons 504 are illustrated within the touch screen display 502. It is understood that in different embodiments, any number of application icons 504 may be presented in the touch screen display 502. In some embodiments of the UE 500, a user may be able to download and install additional applications on the UE 500, and an icon associated with such downloaded and installed applications may be added to the touch screen display 502 or to an alternative screen. The UE 500 may have other components such as electro-mechanical switches, speakers, camera lenses, microphones, input and/or output connectors, and other components as are well known in the art. The UE 500 may present options for the user to select, controls for the user to actuate, and/or cursors or other indicators for the user to direct. The UE 500 may further accept data entry from the user, including numbers to dial or various parameter values for configuring the operation of the handset. The UE 500 may further execute one or more software or firmware applications in response to user commands. These applications may configure the UE 500 to perform various customized functions in response to user interaction. Additionally, the UE 500 may be programmed and/or configured over-the-air, for example from a wireless base station, a wireless access point, or a peer UE 500. The UE 500 may execute a web browser application which enables the touch screen display 502 to show a web page. The web page may be obtained via wireless communications with a base transceiver station, a wireless network access node, a peer UE 500 or any other wireless communication network or system.

Figure 6:
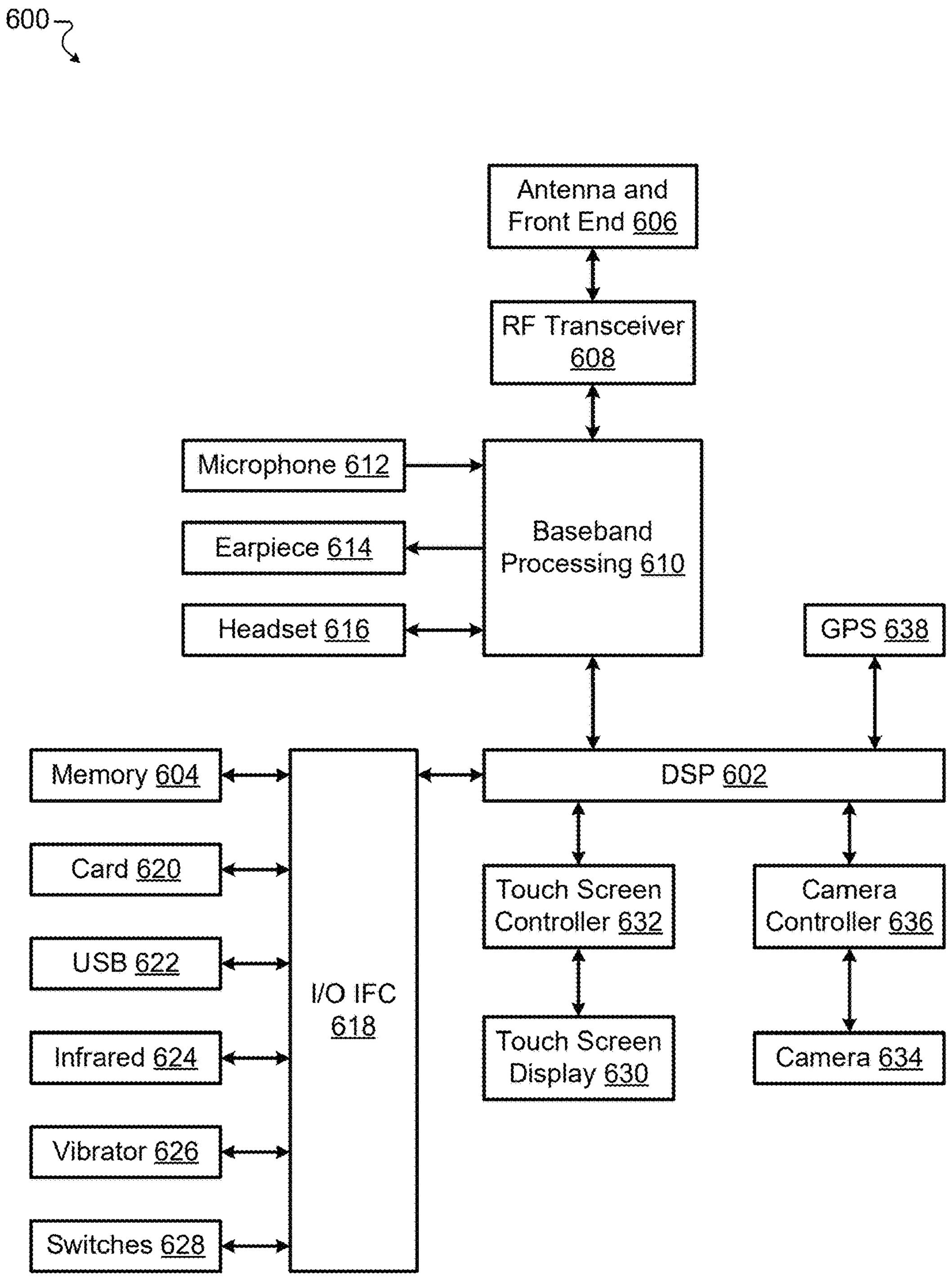
FIG. 6 illustrates a block diagram of an example user equipment.

FIG. 6 shows a block diagram of a UE 600. The UE 600 may be similar to the UE 500 of FIG. 5. While a variety of known components of handsets are depicted, in an embodiment a subset of the listed components and/or additional components not listed may be included in the UE 600. The UE 600 includes a digital signal processor (DSP) 602 and a memory 604. As shown, the UE 600 may further include one or more antenna and front end unit 606, a one or more radio frequency (RF) transceiver 608, a baseband processing unit 610, a microphone 612, an earpiece speaker 614, a headset port 616, an input/output interface 618, a removable memory card 620, a universal serial bus (USB) port 622, an infrared port 624, a vibrator 626, one or more electro-mechanical switches 628, a touch screen display 630, a touch screen controller 632, a camera 634, a camera controller 636, and a global positioning system (GPS) receiver 638. In an embodiment, the UE 600 may include another kind of display that does not provide a touch sensitive screen. In an embodiment, the UE 600 may include both the touch screen display 630 and additional display component that does not provide a touch sensitive screen. In an embodiment, the DSP 602 may communicate directly with the memory 604 without passing through the input/output interface 618. Additionally, in an embodiment, the UE 600 may comprise other peripheral devices that provide other functionality.

The DSP 602 or some other form of controller or central processing unit operates to control the various components of the UE 600 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the UE 600 to function as a peripheral device to exchange information with a personal computer or other computer system. The infrared port 624 and other optional ports such as a Bluetooth® interface or an IEEE 802.11 compliant wireless interface may enable the UE 600 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long-term evolution (LTE), a code division multiple access (CDMA), a global system for mobile communications (GSM) wireless communication protocol. In an embodiment, one of the radio transceivers 608 may comprise a near field communication (NFC) transceiver. The NFC transceiver may be used to complete payment transactions with point-of-sale terminals or other communications exchanges. In an embodiment, each of the different radio transceivers 608 may be coupled to its own separate antenna. In an embodiment, the UE 600 may comprise a radio frequency identify (RFID) reader and/or writer device.

The switches 628 may couple to the DSP 602 via the input/output interface 618 to provide one mechanism for the user to provide input to the UE 600. Alternatively, one or more of the switches 628 may be coupled to a motherboard of the UE 600 and/or to components of the UE 600 via a different path (e.g., not via the input/output interface 618), for example coupled to a power control circuit (power button) of the UE 600. The touch screen display 630 is another input mechanism, which further displays text and/or graphics to the user. The touch screen LCD controller 632 couples the DSP 602 to the touch screen display 630. The GPS receiver 638 is coupled to the DSP 602 to decode global positioning system signals, thereby enabling the UE 600 to determine its position.

Figure 7:
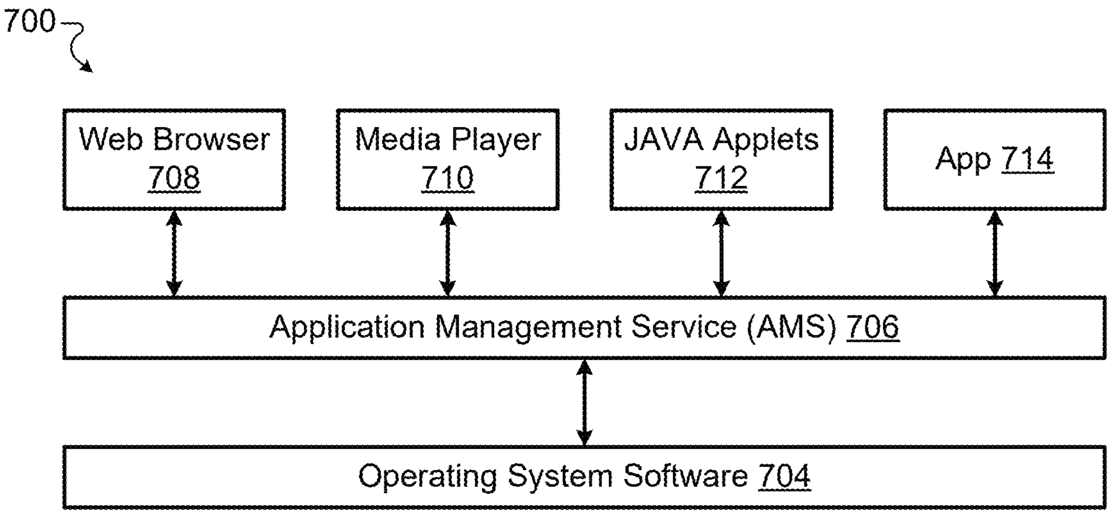
FIG. 7 illustrates an example software environment that may be implemented by a digital signal processor.

FIG. 7 illustrates a software environment 700 that may be implemented by a DSP, such as the DSP 602 of FIG. 6. The DSP executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on a UE, such as UE 500. Also shown in FIG. 7A are a web browser application 708, a media player application 710, and JAVA applets 712. The web browser application 708 may be executed by the UE to browse content and/or the Internet, for example when the UE is coupled to a network via a wireless link. The web browser application 708 may permit a user to enter information into forms and select links to retrieve and view web pages. The media player application 710 may be executed by the UE to play audio or audiovisual media. The JAVA applets 712 may be executed by the UE to provide a variety of functionality including games, utilities, and other functionality.

Figure 8:
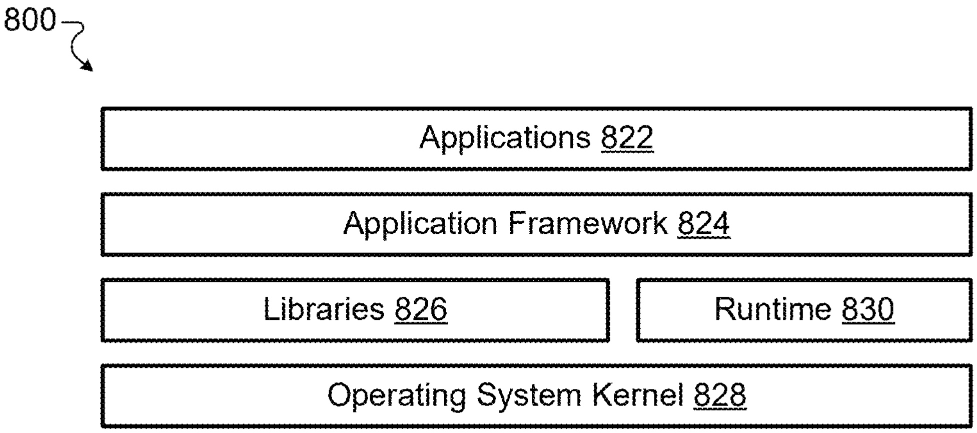
FIG. 8 illustrates another example software environment that may be implemented by a digital signal processor.

FIG. 8 illustrates an alternative software environment 800 that may be implemented by a DSP, such as the DSP 602 of FIG. 6. The DSP executes operating system kernel (OS kernel) 828 and an execution runtime 830. The DSP executes applications 822 that may execute in the execution runtime 830 and may rely upon services provided by the application framework 824. Applications 822 and the application framework 824 may rely upon functionality provided via the libraries 826.

Figure 9:
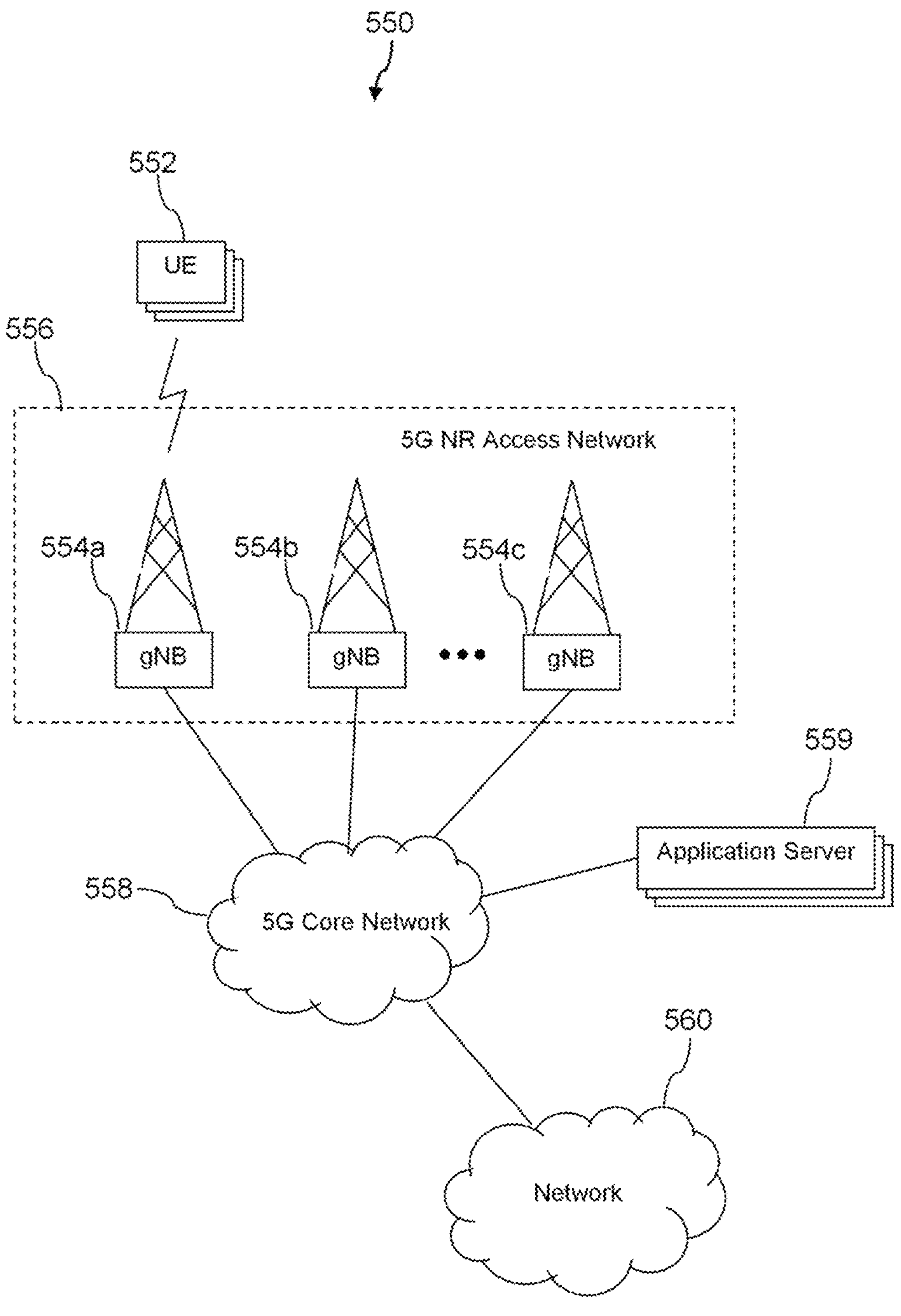
FIG. 9 illustrates an example communication system.

FIG. 9 illustrates an example communication system 550. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 10:
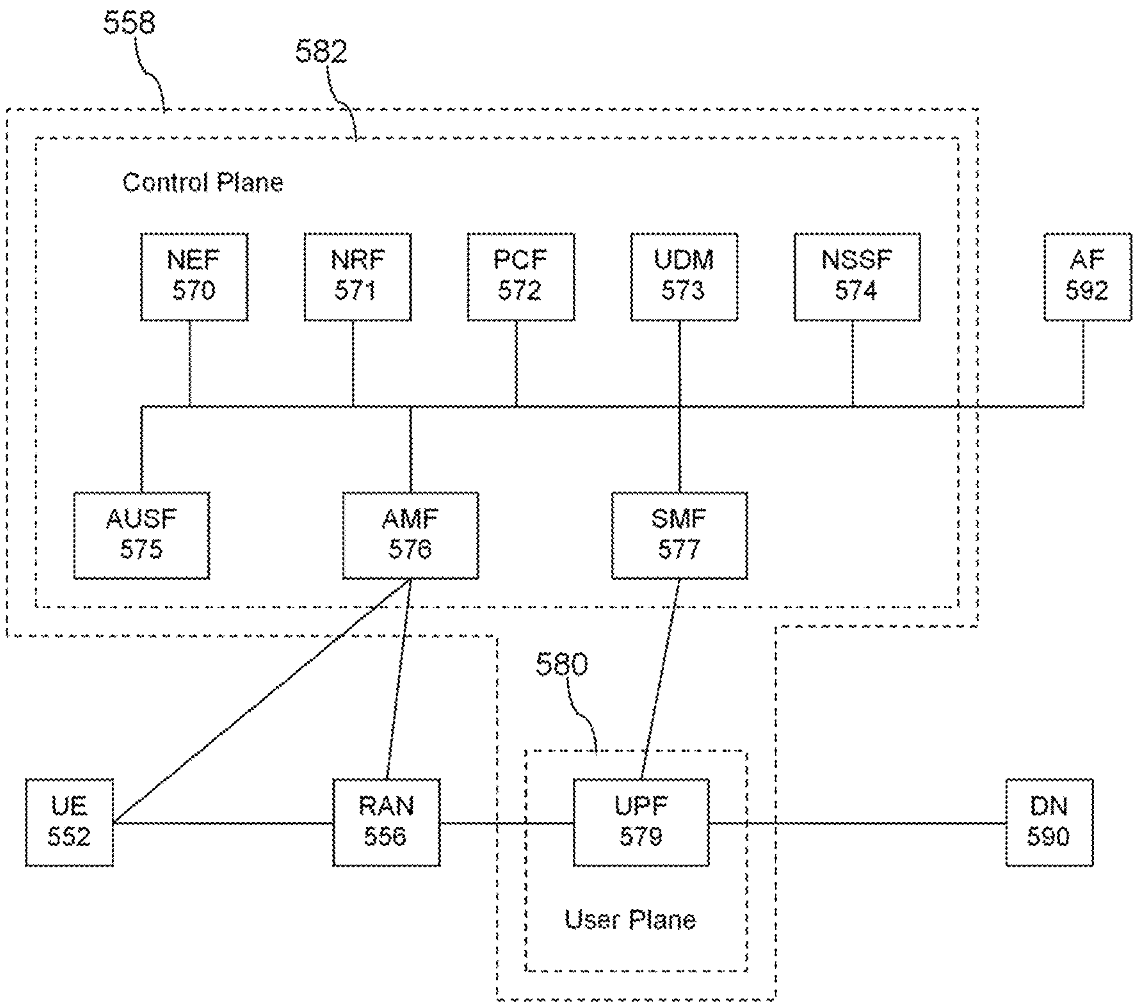
FIG. 10 illustrates details of an example core network.

FIG. 10 illustrates details of an example core network 558. In an embodiment, the core network 558 is a 5G core network. 5G core network technology is based on a service-based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 9). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

While several implementations have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various implementations as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method that is configured to limit transmitting sensitive data to a zombie server, comprising:

generating, by an application of a computing device, first sensitive data that is associated with the computing device;

transmitting, by the application of the computing device and to the zombie server that is configured to transmit an error message in response to receiving any type of data, the first sensitive data;

receiving, by the application of the computing device and from the zombie server, a first error response;

based on receiving the first error response, incrementing, by the application of the computing device, an error response count that indicates a number of error responses received from the zombie server;

comparing, by the application of the computing device, the first error response count received from the server to a first error response count threshold;

based on comparing the first error response count to the first error response count threshold, determining, by the application of the computing device, that the error response count does not satisfy the first error response count threshold;

based on determining that the error response count does not satisfy the first error response count threshold, generating, by the application of a computing device, second sensitive data that is associated with the computing device;

transmitting, by the application of the computing device and to the zombie server, the second sensitive data;

receiving, by the application of the computing device and from the zombie server, a second error response;

based on receiving the second error response, generating, by the application of the computing device, first heartbeat data that is associated with the computing device;

transmitting, by the application of the computing device and to the zombie server, the first heartbeat data;

generating, by the application of the computing device, second heartbeat data that is associated with the computing device; and transmitting, by the application of the computing device and to the zombie server, the second heartbeat data.

2. The method of claim 1, comprising:

storing, by the application of the computing device, the first sensitive data in a diagnostic data storage medium of the computing device; and storing, by the application of the computing device, the second sensitive data in the diagnostic data storage medium.

3. The method of claim 1, comprising:

encrypting, by the application of the computing device, the first sensitive data, wherein transmitting, by the application of the computing device and to the zombie server, the first sensitive data comprises transmitting the encrypted first sensitive data.

4. The method of claim 1, wherein the first error message is a 400/500 failure response.

5. A method that is configured to prevent a computing device from outputting sensitive data in response to receiving an error response from a server and while the computing device is unable to receive software updates, comprising:

generating, by a headless application of the computing device, first personally identifiable information;

storing, by the headless application of the computing device, the first personally identifiable information in a diagnostic data storage medium of the computing device;

determining, by the headless application of the computing device, a first panic level that indicates to transmit the first personally identifiable information to a server and a first temporal frequency for the headless application to send the first personally identifiable information to the server;

based on satisfying the first temporal frequency, transmitting, by the headless application of the computing device and to the server, the first personally identifiable information;

receiving, by the headless application of the computing device and from the server, a first error response that indicates an error occurred because of transmitting the first personally identifiable information;

based on receiving the first error response, incrementing, by the headless application of the computing device, an error response count that indicates a number of error responses received from the server;

comparing, by the headless application of the computing device, the first error response count received from the server to a first error response count threshold;

based on comparing the first error response count to the first error response count threshold, determining, by the headless application of the computing device, that the error response count satisfies the first error response count threshold;

based on determining that the error response count satisfies the first error response count threshold, updating, by the headless application of the computing device, the first panic level to a second panic level that indicates to cease transmitting second personally identifiable information and indicates to transmit heartbeat data to the server and a second temporal frequency for the headless application to send the heartbeat data to the server;

based on satisfying the second temporal frequency, transmitting, by the headless application of the computing device and to the server, the heartbeat data;

receiving, by the headless application of the computing device and from the server, a second error response that indicates an error occurred because of transmitting the heartbeat data;

based on receiving the second error response, incrementing, by the headless application of the computing device, the error response count;

comparing, by the headless application of the computing device, the error response count received from the server to a second error response count threshold;

based on comparing the error response count to the second error response count threshold, determining, by the headless application of the computing device, that the error response count satisfies the second error response count threshold; and based on determining that the error response count satisfies the second error response count threshold, updating, by the headless application of the computing device, the second panic level to a third panic level that indicates to cease transmitting additional heartbeat data to the server.

6. The method of claim 5, wherein the second panic level indicates to delete the first personally identifiable information and other personally identifiable information from the diagnostic data storage medium of the computing device.

7. The method of claim 5, comprising:

encrypting, by the headless application of the computing device, the first personally identifiable information, wherein transmitting, by the headless application of the computing device and to the server, the first personally identifiable information comprises transmitting the encrypted first personally identifiable information.

8. The method of claim 5, wherein the first error message is a 400/500 failure response.

9. A computer-implemented method comprising:

generating, by an application of a computing device, first diagnostic data that is associated with the computing device;

transmitting, by the application of the computing device and to a server, the first diagnostic data;

receiving, by the application of the computing device and from the server, an error response that indicates an error occurred because of transmitting the first diagnostic data; and in response to receiving the error response, determining, by the application of the computing device, a panic level that indicates a type of data for the application to send to the server and a temporal frequency for the application to send the type of data to the server; and based on the panic level, ceasing, by the application of the computing device, transmitting, to the server, second diagnostic data that is associated with the computing device.

10. The method of claim 9, comprising:

in response to receiving the error response, ceasing, by the application of the computing device, generation of second diagnostic data.

11. The method of claim 9, comprising:

in response to receiving the error response, updating, by the application of the computing device, an error response count that indicates a number of error messages received from the server.

12. The method of claim 9, comprising:

accessing, by the application of the computing device, an error response count that indicates a number of error messages received from the server;

comparing, by the application of the computing device, the error response count to an error response count threshold; and determining, by the application of the computing device, that the error response count satisfies the error response count threshold, wherein ceasing transmitting, to the server, the second diagnostic data is further based on determining that the error response count satisfies the error response count threshold.

13. The method of claim 9, comprising:

generating, by the application of the computing device, first heartbeat data that is associated with the computing device;

transmitting, by the application of the computing device and to the server, the first heartbeat data;

after receiving the error response, generating, by the application of the computing device, second heartbeat data that is associated with the computing device; and transmitting, by the application of the computing device and to the server, the second heartbeat data.

14. The method of claim 9, comprising:

generating, by the application of the computing device, first heartbeat data that is associated with the computing device;

transmitting, by the application of the computing device and to an additional server, the first heartbeat data;

receiving, by the application of the computing device and from the additional server, a success response that indicates the additional server successfully received the first heartbeat data;

after ceasing transmitting, to the server, the second diagnostic data and in response to receiving the success response, generating, by the application of the computing device, third diagnostic data that is associated with the computing device; and transmitting, to the additional server, the third diagnostic data that is associated with the computing device.

15. The method of claim 9, comprising:

receiving, by the computing device, data identifying an additional server and instructions to update the application; and updating, by the computing device, the application to specify that the application sends additional heartbeat data or additional diagnostic data to the additional server.

16. The method of claim 9, comprising:

storing, by the application of the computing device, the first diagnostic data; and in response to receiving the error response, deleting, by the application of the computing device, the first diagnostic data.

17. The method of claim 9, comprising:

encrypting, by the application of the computing device, the first diagnostic data, wherein transmitting, by the application of the computing device and to the server, the first diagnostic data comprises transmitting the encrypted first diagnostic data.

18. The method of claim 9, wherein the server is configured to transmit the error response in response to receiving any type of data.

19. The method of claim 9, wherein the diagnostic data includes personal identifiable information.

* * * * *